April 23, 1957   M. R. THORBURN   2,789,441
DRIVING MECHANISMS
Filed Jan. 25, 1955
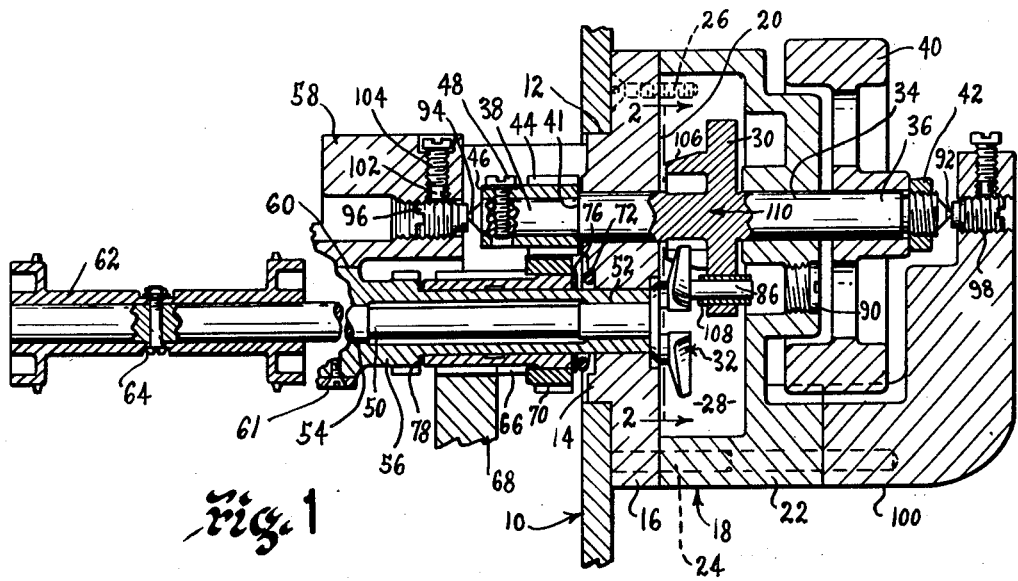
Fig. 1
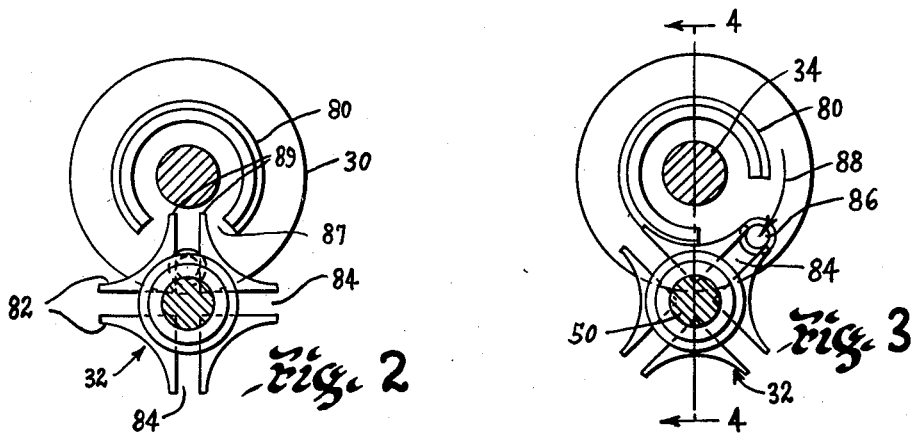
Fig. 2
Fig. 3
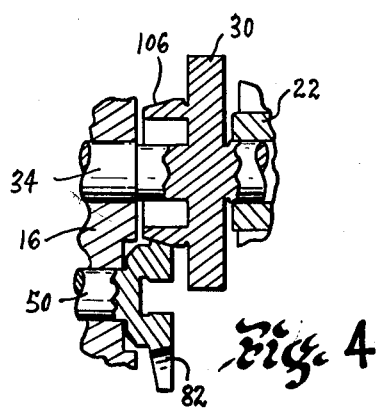
Fig. 4
INVENTOR
MILTON R. THORBURN
BY Louis L. Gagnon
Noble S. Williams
ATTORNEYS

United States Patent Office 2,789,441
Patented Apr. 23, 1957

2,789,441

DRIVING MECHANISMS

Milton R. Thorburn, Williamsville, N. Y., assignor to American Optical Company, Southbridge, Mass., a voluntary association of Massachusetts Application January 25, 1955, Serial No. 484,046

2 Claims. (Cl. 74—436)

This invention relates to improvements in intermittent driving mechanisms, and more particularly to improvements in intermittent driving mechanisms of the Geneva type intended for use in motion picture projection apparatus and the like for advancing strip film successive equal increments of travel in a step-by-step fashion relative to a predetermined station, for example, the projection aperture of the apparatus; said mechanism includes means for insuring an exceedingly high accuracy of operation thereof and being of such sturdy and conveniently arranged construction as to readily enable and thereafter maintain said high accuracy under normal operating conditions for relatively long periods of service without requiring attention or adjustment thereof.

While various types of intermittent drive mechanisms have been used heretofore in motion picture cameras and projection equipment and the like, it has been found in such equipment wherein a top quality of performance and a relatively long period of service are required without attention or adjustment that Geneva type intermittents provide the most accurate and dependable service. A good quality Geneva mechanism, however, is not an easy or inexpensive device to make, for it must have its variously shaped interfitting parts exceedingly accurately made and precisely positioned relative to one another for operation without looseness or binding for all operative positions thereof, and these parts, furthermore, must be specially heat treated so as to provide long service without wear or play developing.

In fact at the present time with much larger projection viewing screens and greater magnifications being used in commercial motion picture theater equipment, the requirement for precision performance in Geneva mechanisms of such equipment has become exceedingly high. When it is considered that a picture image upon a film at a projection aperture of such motion picture equipment is to be magnified as much as six hundred times or more as it appears upon the viewing screen, it will be readily appreciated that any slight variation in the positioning of successive film frames at the projection aperture will be exceedingly magnified when projected and accordingly noticeable and objectionable in the picture upon the viewing screen.

The present invention, however, provides improved means in the form of a Geneva type intermittent driving mechanism provided with means whereby an exactness of fit between the operating parts may be easily and precisely obtained, and thereafter the smallest of variations which may develop between these highly accurately made parts during a running-in period or during extended operation of the mechanism may be easily eliminated or reduced to a minimum. Furthermore, the improved mechanism is of such a construction and arrangement that should any such wear in the parts occur, this wear may be compensated for without in any way altering the operative relation between the gears supplying power to the mechanism and in such a manner that the initial high accuracy of operation provided the equipment will be maintained.

It is accordingly an object of the present invention to provide in a Geneva type intermittent driving mechanism for use in equipment requiring a transforming of continuous rotary motion into an intermittent step-by-step motion of high accuracy, improved means whereby exceedingly accurate like increments of intermittent rotary motion may be provided by the mechanism.

It is an additional object of the invention to provide in such a Geneva type intermittent driving mechanism a construction and arrangement of parts whereby the mechanism may be easily assembled and adjusted for use and also easily readjusted if necessary.

Other objects and advantages of the invention will become apparent from the detailed description which follows when taken in conjunction with the accompanying drawing in which:

Fig. 1 is a vertical sectional view of an intermittent driving mechanism for use in a motion picture apparatus and embodying the present invention;

Fig. 2 is a sectional view taken substantially on line 2—2 of Fig. 1 and looking in the direction of the arrows;

Fig. 3 is a sectional view similar to Fig. 2 but showing parts thereof rotated to a different operative position; and Fig. 4 is a vertical sectional view taken substantially upon line 4—4 of Fig. 3 and looking in the direction of the arrows.

Referring to the drawings in detail and particularly Fig. 1, a wall portion of a motion picture projector housing or the like is indicated at 10 and provided therein is an aperture 12 of appreciable size into which is arranged to fit a projecting flange portion 14 of a main supporting member 16 for a Geneva intermittent mechanism generally indicated by the numeral 18. The supporting member 16 is preferably removably secured to the housing wall 10 by screws or the like (not shown) and has attached to its opposite side or outer face 20 a casing member 22 for enclosing operating parts of the intermittent mechanism, presently to be described. The casing member 22 and main supporting member 16 may be accurately held in proper position to each other by means of a plurality of spaced aligning pins, one of which is indicated at 24, and a plurality of spaced screws, one of which is indicated at 26. It should be noted here that the large aperture 12 referred to above is of such a size as to allow the parts of the mechanism located to the left of wall 10 to pass therethrough as when the mechanism is being inserted or removed as a unit from the projector.

The casing member 22 and supporting member 16 together form a closed chamber 28 in which are located a driving wheel 30 and a star wheel 32 constituting the main driving parts of the Geneva type intermittent mechanism. The driving wheel 30 is preferably integral with a spindle 34 and this spindle has two cylindrical parts thereof located at opposite sides of the wheel 30 so as to be journaled respectively in bearings in the members 16 and 22. Free end portions 36 and 38 of the spindle extending therebeyond are specially formed, the end portion 36 being slightly tapered to receive a relatively heavy fly wheel 40 press fitted thereon and the opposite end portion 38 of said spindle being of smaller diameter and provided with a shoulder 41 so as to receive a pinion gear 44. The fly wheel 40 is secured in place by the clamping action of a nut 42 threaded onto the spindle 34 and the pinion is provided with a collar or flanged outer end portion 46 through which a securing screw 48 may extend. The screw 48 threads into the end 38 and detachably retains the pinion 44 in driving relation wtih the spindle 34, The star wheel 32 is preferably formed as an integral part of a sprocket driving shaft or spindle 50 and is located on the inner end thereof, and this spindle is in turn journaled to rotate in spaced bearings 52 and 54 formed in a tubular supporting member 56. The tubular member 56 is carried by the main supporting member 16 and by a bracket 58 secured thereto. The bracket 58 is secured in place by screw means (not shown) and extends sufficiently outwardly from the member 16 so as to provide a large opening 60 for accommodating and supporting an outer portion of the tubular supporting member 56. A screw 61 serves to retain the tubular member 56 in place.

Upon the outer free end portion of the driving spindle 50 is carried a film driving sprocket wheel 62 removably secured in place by securing means 64. About the tubular supporting member 56 is journaled an intermediate driving gear 66 arranged to have driving engagement with a main driving gear 68 and gear 66 in turn carries on an end portion thereof a larger ring gear 70 press fitted thereon and engaging the previously mentioned pinion gear 44. Spring means 72 and a thrust collar 76 serve to retain the intermediate driving gear 66 in place upon the tubular supporting member 56 and closely adjacent a should 78 formed thereon. Thus it will be seen that power being supplied by the continuously rotating main driving gear 68 will be transmitted to the intermediate driving gear 66 and thus to the ring gear 70 to rotate the pinion 44 and the spindle 34 carrying driving wheel 30 of the Geneva mechanism.

The driving wheel 30, as clearly shown by Figs. 2 and 3, is of circular shape and is provided with a partly circular abutment portion 80 on one side face thereof and this portion 80 is arranged to have locking engagement with any one of a plurality of arcuately shaped locking surfaces 82 provided upon the star wheel 32. In the particular modification shown, four spaced arcuate locking surfaces 82 are provided and intermediate each adjacent pair of surfaces 82 is provided with a parallel-sided radially extending slot 84. The arrangement is such that any one of these slots 84 may be engaged by a driving or camming pin 86 carried by and extending outwardly from a side of the driving wheel 30 as same rotates continuously during operation of the mechanism. The pin 86 is positioned adjacent but radially outwardly of a clearance recess 87 formed between the ends of the portion 80, which portion is of approximately ¾ of a circle in length. The recess 87 allows passage of each successive pair of points 89 of the star wheel during operation thereof.

From these two figures of the drawing showing different operative positions of the driving wheel 30 and star wheel 32, it will be clear that the star wheel should be normally held in a fixed position while the driving wheel rotates through the greater part of its operating cycle by interengagement of the abutment portion 80 with one of the surfaces 82 and until movement of this wheel 30 causes pin 86, traveling in the direction indicated by the arrow 88 (Fig. 3), to enter the particular slot 84 positioned to receive same. After this engagement has occurred further movement of the pin 86 through approximately 90° will cause a 90° rotation of the star wheel 32 and spindle 50 integral therewith. When such angular movement of the star wheel has taken place, the next successive locking surface 82 on the star wheel should be engaged by the partly circular abutment portion 80 and should be held exactly in a predetermined position until the next 270° rotation of the driving pin 86 has taken place.

It will be appreciated, however, that should any slight clearance or play exist between any one of these locking surfaces 82 on the star wheel 32 and the partly circular abutment portion 80 on the driving wheel 30, a slight unwanted movement of the sprocket wheel 62 and thus of the film and the magnified image as well might occur. And of course, it should be kept in mind that a high quality Geneva intermittent is not an easy thing to make for all of the many different parts thereof should be most accurately located and formed relative to each other. Not only must each of the surfaces 82 be perfectly circularly formed and equally radially spaced from the axis of rotation of the spindle 50, but also accurately circumferentially spaced relative to each other. Also each pair of side walls forming slots 84 should be parallel to each other and of proper spacing so as to receive without play or clearance the driving pin 86 and must be perfectly arranged at right angles to the walls of the slots adjacent thereto in order to provide equal amounts of intermittent rotation of the sprocket 62. Additionally the partly circular abutment portion 80 must be exactly circularly formed and of exact predetermined radius and the spacing between its axis of rotation and the axis of rotation of the star wheel when assembled should be exactly correct in order that no play, even though slight, may exist therebetween.

It will also be appreciated that at the same time these several parts and surfaces which must be exactly formed must also be of the highest possible wear resisting qualities in order to withstand the various speeds and intermittent action of the operation of the mechanism for long periods of useful service thereof; and furthermore such high accuracies must be present in the finished parts even though same have been subjected to severe tempering and heat treatments or the like to obtain the high wearing qualities mentioned above.

To further enable the intermittent mechanism to operate with the highest possible degree of accuracy, the partly circular portion 80 on the driving wheel 30 has its abutment or locking surface 106 arranged to slope inwardly toward the axis of the spindle 34 at a predetermined angle, and in the present instance this angle of taper as shown in Fig. 4 is equal to approximately 15 degrees. Thus the surface 106 will be of frusto-conical shape and of partly circular extent. To work with locking surface 106 the spindle 34 carrying driving wheel 30 (see Fig. 1) is provided with a pair of conically shaped hardened axially aligned tips 92 and 94 which are in turn engaged by the flat faces of a pair of set screws 96 and 98. One of these set screws (96), it will be seen, is threaded into the previously mentioned bracket 58 and the other (98) threaded into a cantilever bracket 100 extending outwardly and upwardly from the casing member 22. These set screws 96 and 98 may, after proper axial adjustment thereof, each be securely locked in place by a small soft metal plug 102 and a smaller set screw 104 pressing said plug into firm engagement with threads of the set screw 96 or 98.

The purpose for this arrangement of parts allowing minute axial adjustment of the spindle 34 and accordingly the driving wheel 30 carried thereby, is to enable the partly circular abutment portion 80 integral with wheel 30 and having the sloping abutment surface 106 thereon (see Fig. 4) to be moved into exact operative relation with any one of the locking surfaces 82 on the star wheel. Accordingly, each of these locking surfaces 82 is of partially conical shape and arranged to slope a like amount but in an opposite direction for interengagement with the surface 106.

It has been found desirable in connection with such an intermittent mechanism to arrange the driving pin 86 in such a way that it may be firmly but removably secured to the driving wheel 30. Thus the driving wheel 30 is provided with an aperture therethrough and into this aperture is press fitted the pin 86 having a suitable surrounding collar 108 of softer material for securing the pin in the driving wheel 30. The casing member 22 is provided with a threaded opening therein aligned with the pin 86 when in the position shown in Fig. 1 and this opening is arranged to receive a plug 90; said opening and plug being provided to make the chamber oiltight and allow access to the interior of the chamber 28 for insertion of said pin and collar and like purposes. Thus it will be appreciated that the pin 86 may be exactly made and heat treated to obtain the highest possible wearing qualities before being secured in the wheel 30, and when need be this pin may be easily replaced. Thus it will be seen that not only may the parts of the driving wheel 30 and star wheel 32 be highly accurately made but also that thereafter a very exact operative adjustment therebetween may be conveniently obtained by axial movement of the spindle 34 in the direction of the arrow 110, and this exact adjustment may be accomplished without in any way disturbing the operative engagement or relation between the pinion 44 and ring gear serving to supply power thereto.

Having described my invention, I claim:

1. An intermittent driving mechanism comprising a continuously rotatable driving member, a partially circular abutment surface and a driving pin carried by said driving member for rotation therewith, a rotatable spindle arranged to be intermittently actuated by power from said driving member, supporting means including bearings for rotatably positioning said driving member and said spindle so as to have their axes of rotation disposed in spaced operative relation to each other, a wheel-like member mounted on said spindle for rotation therewith and having a plurality of equally circumferentially spaced generally radially extending slots arranged therein so as to be successively engaged and actuated through predetermined successive increments of rotary movement by said driving pin during rotation of said driving member, a plurality of locking surfaces on said wheel-like member, each of said locking surfaces being disposed intermediate a pair of said radially extending slots, and similarly radially disposed from the axis of rotation of said spindle so as to be successively engaged by said partially circular abutment surface at all times while said driving pin is out of operative engagement with surface portions of said radially extending slots, all portions of said partially circular abutment surface and of each locking surface when adjacent thereto being arranged to conically slope inwardly toward a common point on the axis of rotation of said driving member so as to provide an extended engagement area therebetween, said driving member being axially shiftable in one of said bearings, and adjustment means carried by said supporting means and including a pair of axially shiftable thrust members in operative engagement with the opposite ends of said driving member, and means engageable with said thrust members and said supporting means for producing minute amounts of axial adjustment of said driving member and said abutment surface carried thereby toward said locking surfaces, whereby a minimum normal working clearance may be provided therebetween.

2. An intermittent driving mechanism comprising a continuously rotatable driving member, a partially circular abutment surface and a driving pin carried by said driving member for rotation therewith, a rotatable spindle arranged to be intermittently actuated by power from said driving member, supporting means including bearings for rotatably positioning said driving member and said spindle so as to have their axes of rotation disposed in spaced operative relation to each other, a wheel-like member mounted on said spindle for rotation therewith and having a plurality of equally circumferentially spaced generally radially extending slots arranged therein so as to be successively engaged and actuated through predetermined successive increments of rotary movement by said driving pin during rotation of said driving member, a plurality of locking surfaces on said wheel-like member, each of said locking surfaces being disposed intermediate a pair of said radially extending slots, and similarly radially disposed from the axis of rotation of said spindle so as to be successively engaged by said partially circular abutment surface at all times while said driving pin is out of operative engagement with surface portions of said radially extending slots, all portions of said partially circular abutment surface and of each locking surface when adjacent thereto being arranged to conically slope inwardly toward a common point on the axis of rotation of said driving member so as to provide an extended engagement area therebetween, said driving member being axially shiftable in one of said bearings, and adjustment means on said supporting means and including a pair of set screws having fine threads thereon for engagement with said supporting means and axially movable in operative engagement with the opposite ends of said driving member during manual adjustment thereof so as to produce minute amounts of axial movement of said driving member and said adjustment surface carried thereby toward said locking surfaces, whereby a minimum normal working clearance may be provided therebetween.

References Cited in the file of this patent

UNITED STATES PATENTS

| | | |
|---|---|---|
| 668,086 | Brown | Feb. 12, 1901 |
| 1,803,465 | Dina | May 5, 1931 |